United States Patent [19]
Douglas

[11] 3,868,709
[45] Feb. 25, 1975

[54] PHOTOGRAPHIC APPARATUS WITH FILM RECIPROCATING TRANSPORT SYSTEM

[75] Inventor: Lawrence M. Douglas, South Easton, Mass.

[73] Assignee: Polaroid Corporation, Cambridge, Mass.

[22] Filed: Jan. 2, 1974

[21] Appl. No.: 429,727

[52] U.S. Cl. ............... 354/212, 271/18 R, 354/86, 354/174, 354/319
[51] Int. Cl. ............................................. G03b 1/00
[58] Field of Search ........... 354/174, 180, 186, 212, 354/319, 86; 271/18 R, 19, 24, 128

[56] References Cited
UNITED STATES PATENTS

| | | |
|---|---|---|
| 3,511,152 | 5/1970 | Erlichman............................ 354/319 |
| 3,563,145 | 2/1971 | Bendoni et al........................ 354/86 |
| 3,683,771 | 8/1972 | Land............................... 354/186 X |
| 3,741,095 | 6/1973 | Harvey................................ 354/86 |
| 3,810,210 | 5/1974 | Adamski et al....................... 354/86 |

Primary Examiner—Richard L. Moses
Attorney, Agent, or Firm—John S. Vale

[57] ABSTRACT

A camera of the "self-developing" type that includes a film transport system for advancing an exposed film unit, held in a film container, from the film container to a camera mounted processing station. The transport system features a "static" film engaging member and a carrier mounting the film container for movement relative to the static film engaging member so that it extends through an opening in the film container and advances the film unit through a container film withdrawal slot in response to movement of the carrier.

24 Claims, 12 Drawing Figures

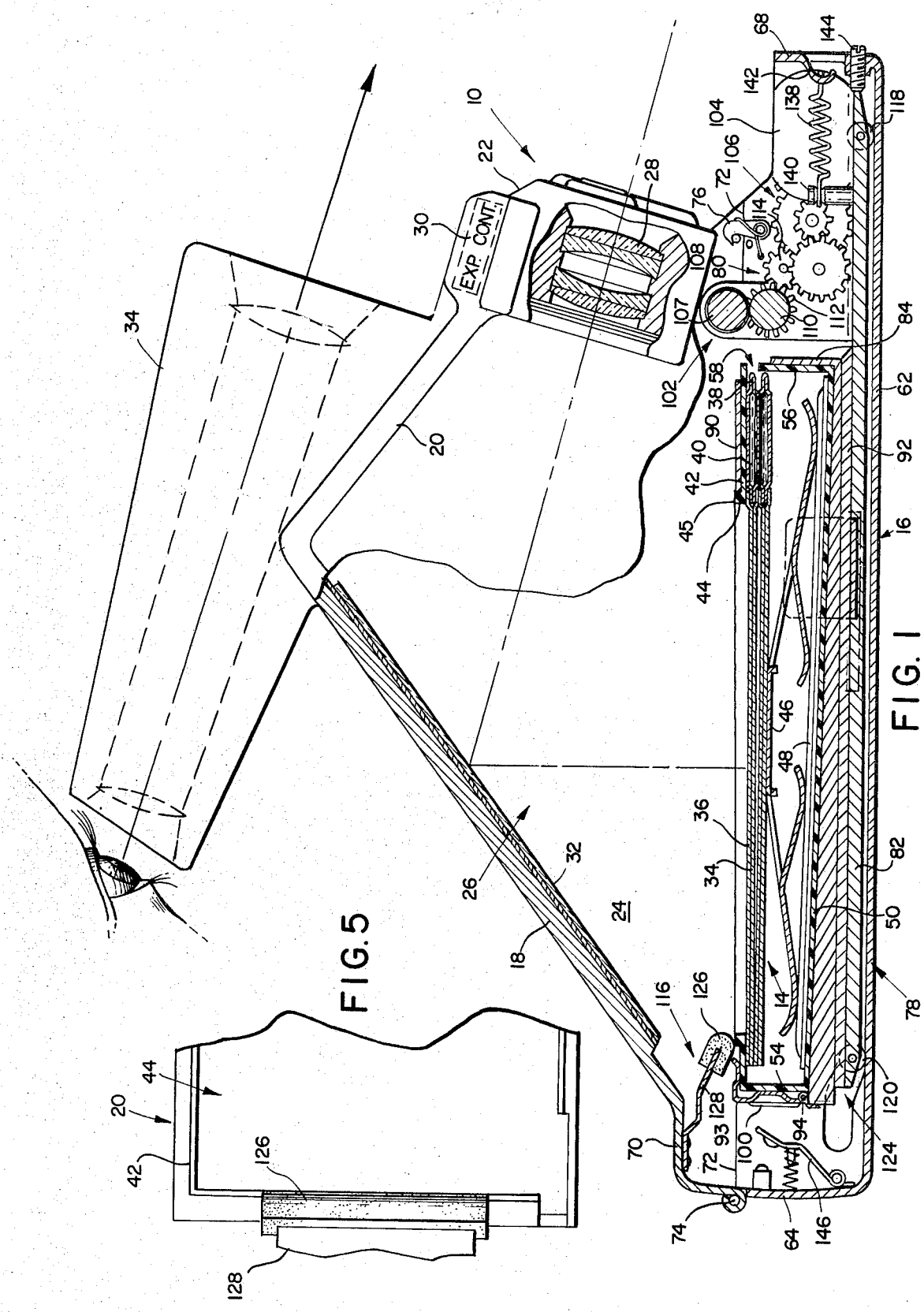

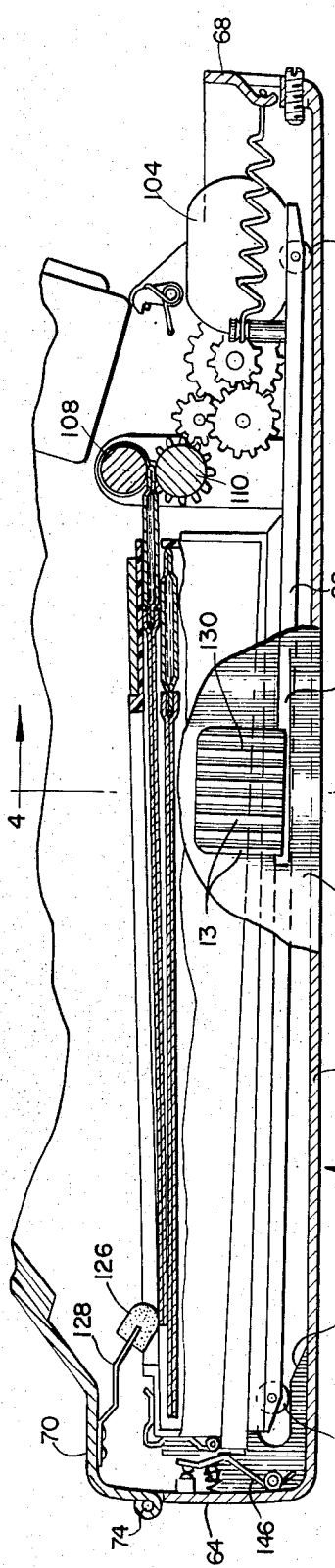
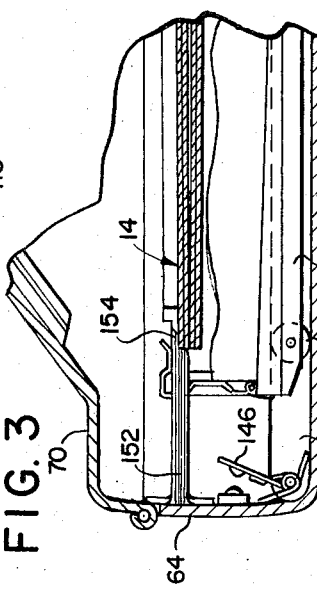
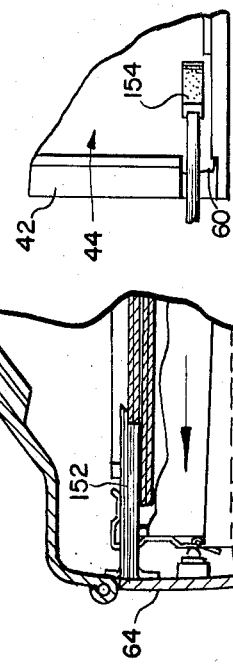
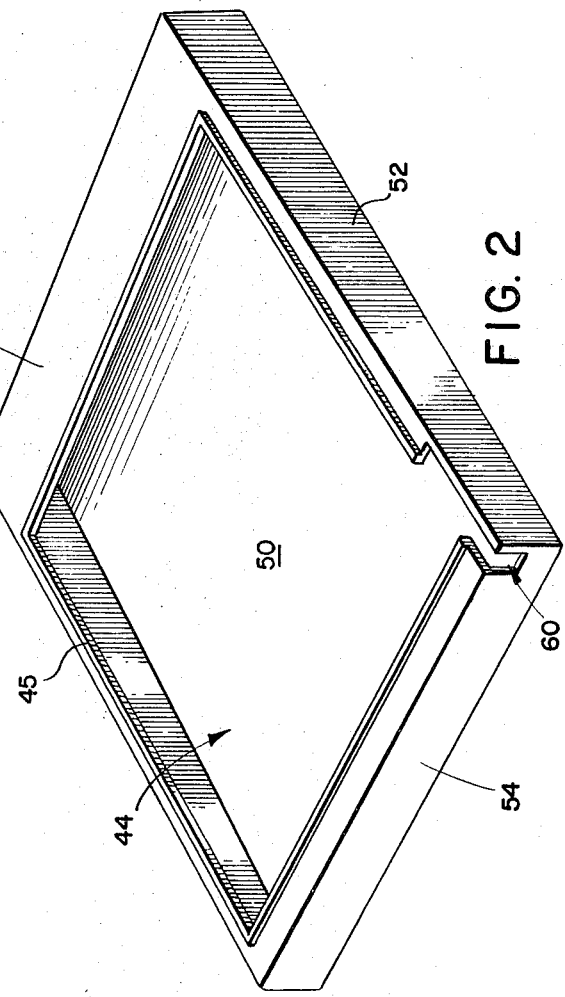

PHOTOGRAPHIC APPARATUS WITH FILM RECIPROCATING TRANSPORT SYSTEM

BACKGROUND OF THE INVENTION

1. Field of the Invention

The present invention relates to the field of photography and, more particularly, to film transport systems in "self-developing" cameras.

2. Description of the Prior Art

Film transports in a self-developing camera generally deals with the movement of a film unit from an exposure position, to a camera mounted processing station and then out of the camera.

Self-developing film units, intended for the mass amateur market, are usually packaged in a disposable film container which holds a plurality of individual film units in stacked relation. The forwardmost film unit in the stack is exposed through an exposure aperture in a forward wall of the container and then is advanced through a film withdrawal slot, in one end of the container, and into engagement with the camera mounted processing station.

The in-camera processing includes subjecting the exposed film unit to a compressive pressure which is applied progressively along the length of the film unit for initially releasing a fluid processing composition from a rupturable container at the leading end of the film unit and thereafter distributing the fluid between predetermined layers of the film unit to initiate a diffusion transfer process which ultimately produces a visible positive image.

The present invention provides a camera which includes a film transport system that is particularly well suited for use with a self-developing film unit of the general type disclosed in U.S. Pat. No. 3,415,644. The film unit may be classified as an integral film product having all of the necessary component parts incorporated into a multi-layer unitary structure.

The film unit is exposed and processed as a single unit. At the end of a self-timing, image-forming process there are no individual photosensitive and image-receiving elements to be separated before the positive image may be viewed.

Another distinguishing feature of this type of film unit is that it does not include film manipulation and withdrawal tab leaders that form an essential part of earlier developed film units. the integral film unit has been designed to be transported by film advance mechanisms forming part of the camera rather than relying on the user to manually pull the exposed film unit out of the container and through the processing station by means of the tabs and leaders.

The prior art discloses many cameras that are equipped with such film advancing mechanisms. For example, U.S. Pat. No. 3,753,392 discloses a reciprocating "pick" that extends through an access opening at the trailing end of the film container and engages the trailing edge of the forwardmost film unit. As the pick advances, it slides the forwardmost film unit over the next underlying film unit and through the film withdrawal slot at the leading end of the film container. The leading end of the film is fed into the bite of a pair of pressure applying rollers which are rotatably driven to advance the film unit therebetween and out of the camera.

In a preferred embodiment, the pick and rollers are driven by a camera mounted motor which is powered by a battery in the film container. An elaborate gear transmission connects the motor with the rollers and pick mechanism.

In an alternate embodiment, a rotating friction wheel is used in place of the pick to engage a top surface of the forwardmost film unit and advance it out of the film container and into the bite of the rollers.

Other examples of cameras having motor driven or manually operated film advancing mechanism of the reciprocating or frictional type may be found in U.S. Pat. Nos. 3,511,152; 3,545,357; 3,350,990; 3,505,943; 3,757,657; and 3,744,386. All of the prior art patents disclosed heretofore are assigned to the same assignee as the present invention.

The film advancing mechanism in self-developing cameras are, by necessity, precision devices. Over the course of thousands of cycles of camera operation, they must reliably engage and accurately move the forwardmost film unit in the film container through the film container withdrawal slot and into the bite of the pressure applying members.

When designing a camera having such a film advance mechanism, the following criteria must be taken into account.

The film advance mechanism must be accurately mounted in the camera body or housing so that it may reliably enter an access opening in the film container. It then must be able to discriminate between the forwardmost film unit and the next underlying film unit and engage only the former. Once engaged, the film advance mechanism must be able to impart a positive (no slippage) forward sliding movement to the forwardmost film unit to advance it a precise distance, in a predetermined plane, into the bite of the pressure rollers.

If the mechanism fails to advance the film unit far enough, there will be no engagement with the pressure applying rollers. When advanced too far forwardly, there is always the chance that the film unit will jam in the rollers.

Another important design criteria is how to coordinate the operation of the film advance mechanism with operation of the film exposure system and the pressure applying rollers. The coordinating mechanisms must be reliable and again precise if the exposure and processing cycle is to be rapid. An example of how complex such a total camera system can become may be found in the previously mentioned U.S. Pat. No. 3,753,392 which discloses a self-developing camera that is representative of a class of highly automated cameras that can expose, process, and eject a film unit in approximately 1.5 seconds.

The above-disclosed prior art film advancing mechanisms all have one common characteristic. They are kinetic devices that move relative to a fixedly supported film container in the camera for engaging and advancing the forwardmost film unit out of the container.

Keeping in mind the above-noted design criteria, especially reliability, one skilled in the art will appreciate that such kinetic film advancing devices account for a very significant portion of the total manufacturing cost of a self-developing camera.

In a highly automated and sophisticated camera, the cost of the kinetic film advance device bears a reasonable relationship to the cost of other camera subsystems such as the optics, exposure control system, and film processing systems. However, in a camera having fewer automated functions and less sophisticated optics, the cost of such a kinetic film advancing system becomes disproportionate.

As will be described hereinafter, the present invention provides a camera which includes a static film advance device. That is, the film engaging member is fixedly supported within the camera housing, and after exposure, the film container is moved within the camera housing and relative to the fixed member to advance the film unit out of the container.

The prior art discloses a camera in U.S. Pat. No. 705,408 issued to Hutchings et al., on July 22, 1902, which included a film transport system having as one part thereof a static film engaging member. The film unit is adapted to be moved from a storage position to the exposure position by moving a film container or magazine relative to the main camera housing.

In light of the present day compact cameras, such a configuration wherein the film magazine must be pulled out of the main camera housing to manipulate or advance the film unit is undesirable and undoubtably would find little in the way of consumer acceptance. More importantly, Hutchings does not disclose, teach, or even suggest how to advance and process a self-developing film unit within the confines of the camera housing.

SUMMARY OF THE INVENTION

The present invention provides a camera having a simplified and relatively inexpensive film transport system which is characterized by a "static" pick or film engaging member. Film advancement is accomplished by moving the film container relative to the static pick to cause the forwardmost film unit in the container to be advanced forwardly through the film withdrawal slot.

In a preferred embodiment, the camera is provided with a sliding tray-like carrier which mounts a pair of pressure applying rollers at one end and means for receiving and supporting a film container behind the rollers with its film withdrawal slot in predetermined relation with the bite between the rollers.

Fixedly mounted in the rear of the camera is a static film engaging member. It may be positioned to enter the film container through an exposure opening in the forward wall of the container or through a special opening provided at the trailing end of the film container for the heretofore known kinetic picks. The film engaging member may be of the frictional type that engages the top surface of the forwardmost film unit or may be fashioned to simply push against the trailing edge of the forwardmost film unit that is accessible through the specially provided opening in the film container.

The tray-like carrier is mounted for movement between a forward exposure position and a rearward terminal position. When located in the exposure position, a film container supported on the carrier has its forwardmost film unit located in the correct position for exposure. After exposure, the carrier is moved (preferably manually) rearwardly engaging the forwardmost film unit with the static film engaging member and causing the film unit to be advanced through the withdrawal slot and into the bite of the carrier mounted rollers.

In a preferred embodiment, at least one of the rollers is adapted to be driven by a carrier mounted electrical motor with energy for the motor being provided by a battery held in the film container. As the carrier approaches the terminal position, it, or the film container supported thereon, engages and closes a normally open switch for energizing the motor. Carrier biasing means may be provided to cause the carrier to return to the exposure position after it has reached the terminal position.

The film transport system of the present invention is much simpler in construction than the complex systems found in highly automatic self-developing cameras. Significant cost reductions may be realized by eliminating or simplifying circuits and mechanisms that provide the coordination of the film transport system with the exposure control system and the pressure rollers.

The static film engaging member system is also a more economical and reliable system than the manually operated film transport systems disclosed in the previously mentioned U.S. Pat. Nos. 3,744,386 and 3,505,943. While the instant film transport system requires a carrier mechanism for moving the film container and rollers relative to the static film engaging member, such a mechanism generally is less expensive because it has fewer moving parts than a kinetic film engaging member with its precision pivot points, shafts, bearings and bushings. Also, the carrier mechanism tends to be more durable because there are fewer parts to wear out or become misaligned.

The carrier mechanism of the present invention is configured to move entirely within the main camera housing between its exposure and terminal positions, thereby retaining the compact nature of the camera. This is a significant advantage over the film transport system described in U.S. Pat. No. 705,508 in which a film magazine must be withdrawn from the main camera housing to cause the static film engaging member to operatively move a film unit. Also, the present invention provides a system for transporting and processing a self-developing film unit, a subject that is not disclosed or even suggested in the above-mentioned patent.

Therefore it is an object of the present invention to provide a photographic apparatus having a simple, economical, and reliable film transport system for advancing a self-developing film unit relative to the apparatus.

It is another object to provide a photographic camera having a fixedly mounted film engaging member and means for moving a film container, holding at least one self-developing film unit, relative to the fixedly mounted film engaging member so that the film engaging member may engage and move the film unit out of the film container.

Another object of the present invention is to provide such a camera having pressure applying means mounted for movement with a film container holding at least one self-developing film unit so that the pressure applying means is in position to receive the film unit as it is advanced from the film container during movement thereof.

Other objects of the present invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 1 is a side elevational view, partly in section, of a camera having a movable carrier in transporting a film container relative to a static friction type of film engaging member, said carrier being shown in an exposure position;

FIG. 2 is a perspective view of the film container shown in FIG. 1;

FIG. 3 is a side elevational view, partly in section, of the lower portion of the camera of FIG. 1 showing the carrier in a terminal position;

FIG. 5 is a top elevational view of the trailing end portion of the film container of FIG. 1 showing the relationship of the film engaging member to an exposure aperture in the film container when the carrier is located in the exposure position;

FIG. 7 is a top elevational view showing an alternative embodiment of a friction type film engaging member which is positioned to extend through an access slot in a trailing end corner of the film container;

FIG. 8 is a side elevational view of a portion of the camera showing an alternate embodiment of the present invention featuring a static edge pusher type of film engaging member with the carrier in an exposure position;

FIG. 9 is similar to FIG. 8 but shows the relationship of the film engaging member with the forwardmost film unit in the film container when the carrier is moved from the exposure position of FIG. 8, rearwardly, to the terminal position of FIG. 9.

DESCRIPTION OF THE PREFERRED EMBODIMENT

Figure 4:
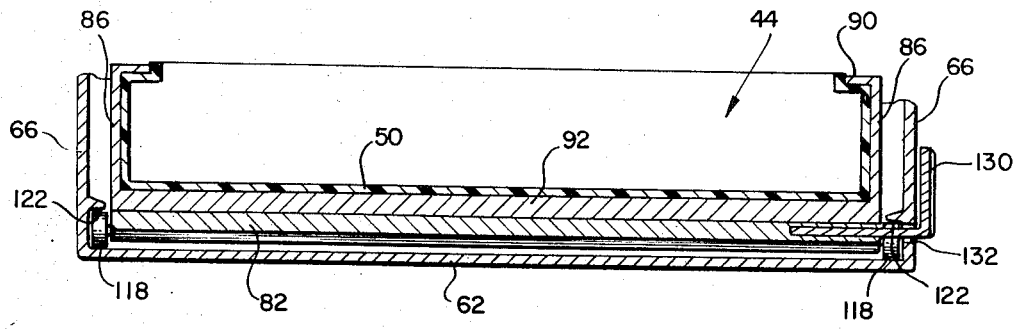
FIG. 4 is a cross-sectional view of the lower portion of the camera taken along lines 4—4 of FIG. 3.

FIG. 1 of the drawings shows a self-developing camera 10 for receiving a film container 12 holding a plurality of self-developing film units 14 and for exposing and processing each of the film units 14 in sequence.

Since the instant disclosure relates mainly to post-exposure film transport and processing, those parts of the camera 10 relating to film exposure will only be described in limited detail to provide the necessary background to clearly explain and disclose the invention.

Camera 10 includes an elongated and generally parallelepiped shaped lower (as viewed in FIG. 1) housing section 16 for receiving the film container 12 and for mounting the film transport and processing mechanisms that will be described later on in the disclosure.

The camera structure above housing section 16 cooperates with section 16 to form a light-tight exposure chamber and mounts the camera's optical and exposure control system.

As best shown in FIG. 1 the upper section of camera 10 includes a rear wall section 18, an intermediate wall section 20, and a forward housing section 22 which extend in articulated fashion respectively from the trailing end of housing section 16 (to the left as viewed in FIG. 1) over section 16 towards the leading end thereof (to the right as viewed in FIG. 1). In cooperation with a pair of enclosing side walls 24 (only one of which is shown) and the upper portion of housing section 16, walls 18 and 20 and forward housing section 22 form a light-tight exposure chamber 26.

Forward housing section 22 mounts an adjustable focus objective lens 28 and a diagrammatically represented exposure control system 30 for controlling the entry of image-bearing light, passing through lens 28, into exposure chamber 26. Typically, the exposure control system includes a shutter mechanism, a variable aperture stop, a photocell system for determining exposure interval, and mechanism for shifting the exposure control system between daylight and flash modes of operation when appropriate.

When the shutter is open, image-bearing light from lens 28 impinges on a mirror 32 mounted on the interior surface of rear wall 18 at a suitable angle in relation to housing section 16 for directing the light downwardly (as viewed in FIG. 1) to form an image on and expose the forwardmost film unit 14 in container 12. While mirror 32 folds the optical path from lens 28 to the forwardmost film unit 14 and thereby provides a more compact camera, its main function is to provide an image-reversal in the optical system so that the positive image formed in the processed film unit has the same directional characteristic as the scene that is photographed. With another type of film unit having opposite directional characteristic there is no need to include a reversal imaging system.

Prior to exposure, framing of the scene and focusing may be accomplished by using a direct viewing lens coupled view finder 34 mounted on intermediate housing section 20.

As illustrated, camera 10 is a non-folding, direct viewing type of photographic apparatus for exposing and processing self-developing film units. It will be understood that it is within the scope of the present invention to incorporate the film transport and processing system, to be described in detail hereinafter, in other types of cameras such as folding and/or reflex cameras.

The illustrated film unit 14 is a representative example of a multi-layer, integral, self-developing film unit of the general type disclosed in U.S. Pat. No. 3,415,644, issued to E. H. Land on Dec. 10, 1968; or U.S. Pat. No. 3,672,890 issued to E. H. Land on June 27, 1972, said patents being assigned to the same assignee as the present invention.

In a preferred embodiment, it comprises a multilayer laminate including a pair of exterior support sheets of layers and a plurality of layers including photosensitive and image-receiving layers disposed between the exterior sheets. In FIG. 1 of the drawings, film unit 14 is illustrated as including a bottom sheet-like element 35, a top sheet-like element 36, and a compressibly rupturable container 38, holding a fluid processing composition 40 and being attached to the leading ends of elements 35 and 36 in position to discharge the fluid 40 between elements 35 and 36.

The actual embodiment of film unit 14 is a multilayer laminate, not a simple two element structure as shown in the drawings for the ease and clarity of illustration. The interface between elements 35 and 36 is meant to diagrammatically represent the interface of two predetermined layers of the multilayer laminate between which the processing composition 40 is to be distributed to initiate the development and diffusion transfer process.

It should be understood that the upper film element 36 includes a transparent exterior sheet over the film unit's image forming area. When the film container is in its exposure position (shown in FIG. 1) this transparent exterior faces upwardly towards mirror 32 in the upper portion of camera 10. During exposure, image-bearing light reflected from mirror 32 is directed through the transparent sheet to expose the photosensitive material in the underlying layers.

The film unit 14 is adapted to be advanced from the exposure position in film container 12, through a pressure applying processing station (to be described later) to cause discharge and distribution of fluid 40 and then out of the camera into the ambient light. Once outside of the camera, further exposure of the photosensitive material through the transparent sheet is prevented by a light-blocking system forming part of the fluid 40. Once the positive image has been formed, the transparent outer sheet provides a protective window through which the image may be viewed.

It will be understood that the film transport and processing system of the present invention is suitable for use with other types of "integral, self-developing" film units that do not require reversal optics (mirror 32). An example of such a film unit may be found in U.S. Pat. No. 3,594,165 issued to H. G. Rogers on July 20, 1971; or U.S. Pat. No. 3,689,262 issued to H. G. Rogers on Sept. 5, 1972, said patents being assigned to the same assignee as the present invention.

Film container 12 is preferably a box-like structure dimensioned to hold a plurality (usually 10) of film units 14 arranged in stacked relation behind a forward wall 42 of the container 12 having a generally rectangular exposure aperture 44 therein which is co-extensive with the image-forming area of the film unit and is bounded by an upstanding rib 45. Behind the last film unit 14 in the stack is a spring biased platen 46 which urges the stack upwardly towards forward wall 42 to locate the forwardmost film unit 14 in position for exposure through aperture 44. Behind platen 46 is a flat electrical battery 48 which rests on the interior surface of a film container rear wall 50.

In FIG. 2, film container 12 is illustrated without its contents. Forward wall 42 is held in predetermined spaced relation with rear wall 50 by a pair of spaced side walls 52 and a cooperating trailing end wall 54. A leading end wall 56 of container 12 stops short of the leading edge of forward wall 42 and in cooperation therewith defines a transverse elongated film withdrawal slot 58 in alignment with the forwardmost film unit. It is through this slot 58 (See FIG. 1) that the camera film advancing mechanism advances or slides the forwardmost film unit in the stack subsequent to its exposure.

In a preferred embodiment, an access opening or slot 60 for the film advancing mechanism is provided in forward wall 42 and trailing end wall 54 near the trailing right hand corner of the film container 12 (as viewed in FIG. 2). Alternatively, the exposure aperture 44 may be used as an access opening through which a film engaging member of the film transport mechanism may extend to engage and advance the fowardmost film unit 14 through withdrawal slot 58.

The film container 12 has other features that are not shown in the drawings. For example, a pair of access openings are provided in container rear wall 50 for camera mounted electrical contacts that connect battery 48 to the camera's electrical system. A dark slide, positioned between the forwardmost film unit 14 and exposure aperture 44, protects the film units from exposure through aperture 44 and access slot 60. Once the film container is located in the light-tight environment of camera 10, the dark slide is ejected from the container 12 and camera 10 in the same manner as the forwardmost film unit. A suitable light sealing arrangement (not shown) is provided for the film withdrawal slot 50. A more detailed description of film container 12 and its contents may be found in a commonly assigned copending application of N. Gold, Ser. No. 213,989, filed on Dec. 30, 1971.

The lower camera housing section 16 and the film transport and processing device will not be described in detail.

Housing section 16, as illustrated, is a generally elongated, hollow, parallelepiped shaped structure having an open top which provides communication with the camera's exposure chamber 26. It includes a planar elongated bottom wall 62 and a trailing end wall 64, a pair of spaced elongated side walls 66 and a short leading end wall 68 arranged in an enclosing rectangular structure upstanding from the edges of bottom wall 66. A rear top wall section 70 is provided to enclose the space between trailing end wall 64 and the lower end of camera rear wall 18.

In a preferred embodiment, housing section 16 is formed in two abutting, horizontal hinged sections which may be spaced apart to allow a film container 12 to be inserted into and removed from the hollow interior of housing section 16. As best shown in FIG. 1, a horizontal parting line 72 extends along the length of side walls 66 and transversely across trailing end wall 64 where the upper and lower portions of housing sections 16 are hinged together for pivotal movement about a transverse shaft or pin 74.

To hold the upper and lower portions of housing section 16 in the closed position of FIG. 1, a releasable latching mechanism 76 mounted on one side wall 66 and spanning the parting line 72 is provided.

When latching mechanism 76 is released, the lower portion of housing section 16 may be pivoted downwardly (clockwise about pin 74 in FIG. 1) thereby spacing the upper and lower portions of housing section 16 so that a film container 12 may be inserted into or withdrawn from the interior of section 16. Closing housing section 16 is accomplished by reversing this procedure.

A basic concept of the present invention is to accomplish at least one part of the film transport function by moving the film container 12, and preferably the camera's film processing station with it, relative to a fixed or static film engaging member for advancing the forwardmost film unit 14 from film container 12 and into engagement with the film processing mechanism.

In a first embodiment of the present invention, housing section 16 is provided with a movable carrier mechanism 78 mounting means for receiving and supporting a film container 12 and a film processing station 80 mounted on the carrier mechanism 78 in predetermined relation with the withdrawal slot 58 of a film container supported on the carrier.

Carrier mechanism 78 preferably includes a relatively thin, but rigid, rectangular and elongated base plate 82 that is to be mounted for movement back and forth along long dimension or length of housing section 16. Base plate 82 is preferably formed of a sheet metal such as steel.

Mounted on top of base plate 82 are means for receiving and supporting a film container 12. The forward end of the film container 12 is located in predetermined longitudinal relationship with base plate 82 by an upstanding transverse retaining plate 84 against which the exterior surface of film container leading end 56 abuts.

Transverse alignment with base plate 82 is provided by a pair of spaced upstanding flanges 86 (See FIG. 4) which are disposed in substantially parallel relationship with leading ends of film container side walls 52.

Coupled between the top ends of flanges 86 is a transverse hold down member 90 that overlies and restrains that portion of the forward wall 42 of film container 12 between its leading edge and the exposure aperture 44.

It will be noted from the side profile of film container 12 in FIG. 1 that the thickness of the container 12 decreases linearly from the leading end wall 56 to the trailing end wall 54 for providing extra space in the leading end of the container 12 to accommodate the plurality of relatively thick fluid containers 38.

In the illustrated camera 10, the exposure plane is substantially parallel to the bottom wall 62 of housing section 16. In order to locate the forwardmost film unit 14 in the film container 12 in the exposure plane it is desirable to provide a tapered wedge shaped member 92 on base plate 82 for supporting the rear wall 50 of container 12 with its trailing end slightly elevated above the top surface base plate 82.

After the leading end of film container 12 has been inserted into its aligned position on base plate 82, it may be releasably secured thereby engaging a latching member 93 with the trailing end of the film container. As best shown in FIG. 1, member 93 may comprise a generally L-shaped bracket that is pivotally coupled to wedge 92 at pivot point 94 for movement between a latching position as shown in FIG. 1, where a vertical section of member 93 bears against the exterior surface of container trailing end wall 54 and a horizontal section overlies and restrains the trailing end portion of container forward wall 42, and an unlatching position (not shown) wherein member 93 is pivoted in a counterclockwise direction away from the trailing end of film container 12 to allow the film container 12 to be located or removed from its position on base plate 82. Latching member is preferably biased towards its latching position by a spring 100.

By means of the aligning, restraining and latching members noted above, the film container 12 may be releasably secured to base plate 82 in a predetermined relationship therewith.

Fixedly mounted on base plate 82, forwardly of the means for receiving and supporting the film container 12 is a pressure applying roller assembly 102, an electrical motor 104, and a gear train assembly 106 connecting the motor with the roller assembly 102.

Roller assembly 102 comprises a pair of spaced upstanding roller mounting brackets 107 fixedly secured to base plate 82 forwardly of film container retaining member 84. Rotatably and transversely mounted in appropriate bearings (not shown) in brackets 107 are a pair of juxtaposed elongated cylindrical rollers 108 and 110 for applying a compressive pressure to a film unit 14 that is progressively advanced therebetween. The brackets 107 are fixedly secured to base plate 82 to accurately position the bite or gap between rollers 108 and 110 in a fixed and predetermined relationship with the film withdrawal slot 58 of a film container 12 supported on base plate 82 in the manner previously described. This predetermined relationship includes fixing the distance between slot 58 and the bite of the rollers 108 and 110 along with establishing the correct roll, pitch and yaw characteristics of the bite with respect to a film unit 14 being advanced through slot 52 along a predetermined exit plane.

In a preferred embodiment, at least one of the rollers 108 and 110 is adapted to be driven in a direction to cause a film unit inserted into the bite to be progressively advanced between the rollers 108 and 110 as they apply compressive pressure. Thus the rollers 108 and 110 serve both as a pressure applying device and as part of the film transport system by advancing the film unit through the processing station 80 and towards the exterior of the camera so that at least a portion of the processed film unit extends outside of the camera housing so the user may grasp it.

In the illustrated embodiment shown in FIG. 1, the lower roller 110 includes a gear 112 at one end thereof which is in mesh with a gear 114 forming part of the gear train 106 coupled to electric motor 104. When motor 104 is energized, roller 110 is rotated in clockwise direction (as viewed in FIG. 1) to cause a film unit inserted into the bite from container 12 to be advanced (to the right) through the rollers 108 and 110.

The motor 104 is preferably energized from the battery 48 in film container 12 by connecting wires (not shown) that electrically couple motor 104 to previously mentioned contacts (not shown) on the wedge shape film container support 92.

Motor 104 is preferably of the high speed type with the appropriate speed reduction being provided by gear train 106. The combination of the high speed motor 106 and the reduction gear train allows the rate at which power is drawn from battery 48 to be set within the optimum power withdrawal rates for the battery 48 thereby assuring that there will be sufficient energy to transport and process all of the film units 14 in container 12.

The film transport system of the present invention features a static pick or film engaging member which is fixedly mounted in camera housing section 16. After the forwardmost film unit is exposed, the carrier base plate 82 is moved, within housing section 16, relative to the static pick which engages and stops the forwardmost film unit 14 while the film container 12, the underlying film units 14 and the roller assembly 102, gear train 104 and motor 106 continue to move as a unit on base plate 82. In this manner, the forwardmost film unit 14 is slidingly advanced through film withdrawal slot 58 and into the bite of rollers 108 and 110.

It is within the scope of the present invention to provide a "frictional" type of static film engaging member for engaging the top surface of the forwardmost film unit (the surface closest to the interior surface of container forward wall 42) and an "edge pusher" type for engaging the trailing edge of the forwardmost film unit. The friction type may be positioned to enter the film container 12 either through the exposure aperture 44 or the film transport access slot 60. The pusher type can only use slot 60 for access.

The choice between a frictional or pusher type will determine the type of motion required by base plate 82 to most effectively engage and advance the forwardmost film unit 14 through withdrawal slot 58.

When using frictional engagement, it is desirable to move the film container both upwardly (transversely to the direction of film advancement), to establish good frictional contact between the static film engaging member, and rearwardly to cause film advancement. With the pusher type of film engaging member, only simple linear rearward motion is required to achieve the same result.

In FIG. 1, camera 10 is equipped with a frictional type of film engaging member 116 that is fixedly positioned in the trailing end of housing section 16 for entering film container 12 through the relatively large exposure aperture 44 in the forward wall 42 of film container 12.

In this embodiment, the carrier base plate 82 is mounted for movement between the exposure position of FIG. 1 to the terminal position of FIG. 3. During the course of rearward movement (opposite the direction of film advancement) from the exposure to terminal position, the trailing end of the carrier base plate is also moved upwardly to bring the static film engaging member 116 into good frictional contact with the top surface of the forwardmost film unit 14 intermediate its leading and trailing edges.

As best shown in FIGS. 1, 3 and 4, carrier base plate 82 is provided with leading and trailing end pairs of guide members 118 and 120 which ride in a pair of longitudinally extending spaced channels or tracks 122 formed on the interior surface of sidewalls 66 of housing section 16.

In a preferred embodiment, guide member 118 and 120 take the form of wheel-like roller bearings which are rotatably mounted on transverse studs or axles that extend outwardly from the lateral sides of carrier base plate 82. The channels or tracks 122 preferably comprise U-shaped extrusions for receiving the roller bearings 118 and 120. The major portion of channels 122 are linear and substantially parallel to the plane of bottom wall 62 of housing section 16. It is on these linear portions of channels 122 that bearings 118 and 120 rest when carrier plate 82 is located in its forward exposure position. Those portions 124 of channels 122 behind the trailing end bearings 120, located in the exposure position, are configured to include a large radius upwardly sloping curve thereby providing ramps for moving the trailing end of plate 82 transversely towards film engaging member 116 (and the film container 12 along with it) as the carrier base plate 82 is moved rearwardly from the exposure position of FIG. 1 towards the terminal position of FIG. 3.

The film engaging member 116 preferably comprises a blunt or rounded nose elongated (see FIG. 5) film engaging portion 126 formed from a somewhat resilient material such as rubber that has suitable friction characteristics for frictionally engaging the top surface of the forwardmost film unit 14 without damaging or scratching it.

The width of the exposure aperture 44 is slightly more than 3 inches. The illustrated film engaging portion 126 of member 116 measures approximately 2 inches in width and is disposed symmetrically with a longitudinal center line of exposure aperture 44. The width of portion 126 is not critical but it is desirable that it be wide enough to establish a relatively large area of contact with the top surface of the forwardmost film unit to distribute the frictional forces and prevent damage to the transparent window of the film unit 14.

The film engaging portion 126 is held in a fixed and predetermined position within housing section 16 by a rigid mounting bracket 128 secured to the interior surface of the short top wall section 70 of housing section 16 so that portion 126 is transversely spaced from the forwardmost film unit 14 in container 12.

In a preferred embodiment, carrier base plate 82 is moved manually between the exposure and terminal positions. For these purposes, a slide member 130 is provided as best shown in FIGS. 3 and 4. Member 130 is positioned over one side wall 66 of housing section 16 and extends through a horizontal slot 132 therein into the interior of housing section 16 where it is fixedly attached to carrier base plate 82.

Movement of the carrier base plate 82 from the terminal position back to the exposure position is preferably accomplished by means of a return spring 138 having one end attached to an upstanding stud 140 in the leading end of carrier base plate 82 and its opposite end secured to a hook 142 on the interior surface of leading end wall 68 of housing section 16.

It is important to accurately establish the exposure orientation of a film container 12 supported on carrier plate 82 so that the exposure aperture 44 of the film container 12 is in alignment with the image projected by the camera's optical system at the exposure plane. The longitudinal exposure position of carrier base plate 82 is established by an adjustable stop 144 at the leading end of housing section 16 against which the leading edge of carrier plate 82 abuts and is held by spring 138. Lateral alignment may be accomplished by adjusting the transverse disposition of side retaining flanges 86 on plate 82.

When carrier plate 82 is located in the exposure position of FIG. 1, the film engaging portion 126 of member 116 is positioned over that portion of upstanding rib 45 bounding the trailing end of exposure aperture 44. It is important that film engaging portion 126 not extend into or cast a shadow into the cone of image-bearing light that is directed through exposure aperture 44 during the exposure mode of operation.

In operation, the forwardmost film unit 14 is exposed and then slide member 130 is moved rearwardly to impart a rearward motion to carrier base plate 82. As the trailing end roller bearing 120 moves up, the ramped portions 124 of tracks 122 cause plate 82 to pivot in a clockwise direction about the leading end bearings 118 thereby elevating or transversely moving the trailing end of film container 12 upwardly in a direction transverse to the direction of film advancement through slot 56 and bring the top surface of the forwardmost film unit into frictional engagement with the film engaging portion 126 of member 116.

Once sufficient frictional contact has been established, film engaging portion 126 serves as a stop for preventing further rearward motion of the forwardmost film unit with the film container 12 and the underlying contents of the film container. As the carrier base plate 82 is moved further rearwardly towards the terminal position, the engaged forwardmost film unit slides between the interior surface of container forward wall 42 and the top surface of the next underlying film unit 14 in the stack, thereby establishing relative motion between the forwardmost film unit 14 and the film container 12 so that its leading end is advanced through the film withdrawal slot 58 and into the bite of rollers 108 and 110.

Just before the leading end of the film unit reaches the bite of rollers 108 and 110, the trailing end of the film container 12 engages and closes a normally open electrical switch 146 to electrically connect battery 48 to motor 104. With motor 104 in its energized state, the lower roller 110 is driven by gear train 106 to cause the film unit 14 to be advanced therebetween for the progressive application of compressive pressure along its length to cause discharge and subsequent distribution of the fluid processing composition between predetermined layers of the film unit 14.

Figure 6:
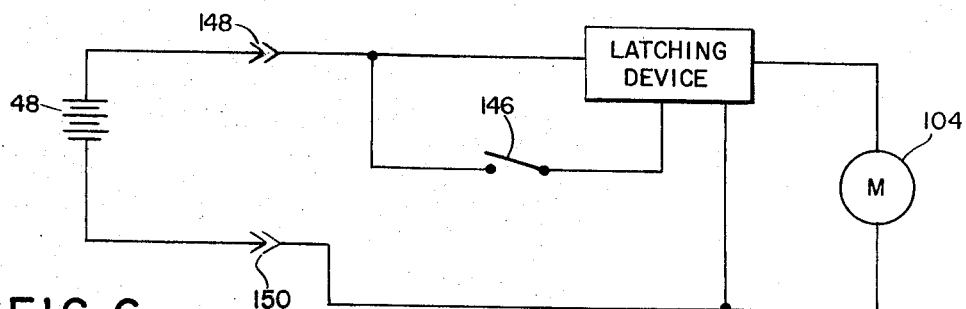
FIG. 6 is a diagrammatic illustration of an electronic circuit for controlling the operation of a camera mounted processing station.

Rather than have the user hold the carrier base plate 82 in its terminal position, via slide member 130, until film unit 14 is completely advanced through rollers 108 and 110, it is preferable to provide a simple latching circuit such as the one diagrammatically illustrated in FIG. 6 for keeping the battery 48 in electrical contact with motor 104 for a predetermined time period (typically between 1 and 3 seconds) after the initial energization of the motor 104 even if forward movement of carrier plate 82 causes switch 146 to become open.

FIG. 6 shows the battery 48 being connected to the latching circuit at contacts 148 and 150. Connected in series between battery 48 and motor 104 is a normally open circuited latching device or circuit which may be made to switch to a conducting mode of operation by closing switch 146. Such a circuit may be of the solenoid or solid state types that are well known in the electronics art. After switch 146 is closed, the latching device will supply power to motor 104 for a predetermined time and then automatically shift to its open circuit or non-conducting mode regardless of the condition of switch 146.

FIG. 3 shows the carrier base plate 82 in the terminal position with the leading end of the forwardmost film unit in the bite of rollers 108 and 110. While the frictional contact of film engaging portion 126 is sufficient to cause the sliding movement of the forwardmost film unit out of container 12 and into the bite of the rollers, it does not impede the forward motion imparted to the film unit by rollers 108 and 110 and the trailing end of the film unit may be easily advanced between film engaging portion 126 and the next underlying film unit.

Although not shown in the drawings, the leading end wall 56 of film container 12 is provided with a resilient finger that extends upwardly and part way across withdrawal slot 58 at one end thereof. This resilient finger prevents the film unit beneath the forwardmost film unit from being advanced through slot 58, along with the forwardmost film unit, both upon the initial advancement of the forwardmost film unit and when the rollers 108 and 110 pull the trailing end of the forwardmost film unit from between portion 126 and the top surface of the next underlying film unit.

When the slide member 130 is released, the carrier base plate 82 returns from the terminal position of FIG. 3 to the exposure position of FIG. 1 under the influence of biasing spring 138. The trailing end of the base plate 82 pivots downwardly (counterclockwise as viewed in FIG. 1) about leading end bearings 118 thereby lowering the trailing end of film container 12 and allowing the film engaging portion 126 of member 116 to clear the upstanding rib 45 bordering exposure aperture 44. After the forwardmost film unit 14 has been fully extracted from the film container 12, the next underlying film unit is automatically moved up to the exposure position by the spring platen 46.

In the embodiment just described, the frictional film engaging portion 126 is mounted so as to enter film container 12 through the exposure aperture 44. It is also within the scope of the present invention to provide a frictional type of film engaging member 151 that is fixedly mounted in camera 10 so as to engage the forwardmost film unit by extending through the access slot 60 as is shown in FIG. 7 of the drawings.

The advantage of such a configuration is that it does not engage the image area of the film unit and the problem of possibly scratching or damaging the transparent image viewing window of the film unit is eliminated. Also, the problem of clearing rib 45 and casting a shadow onto the image-forming area of the film unit are obviated. However, because of the relatively small top surface area of the forwardmost film unit exposed by slot 60, the design and manufacturing tolerances of the film engaging member 151 are more critical than the previously described film engaging member 126 to assure the establishment of good frictional contact on a repeatable basis.

A second embodiment of the present invention is shown in FIGS. 8 and 9. It features a film transport system that includes a static edge pushing type of film engaging member rather than the frictional type.

For the sake of brevity, the numerical designation of components of camera 10 that are the same whether the end pusher or friction type of film engaging member are used will remain the same.

In this embodiment, a static end pusher film engaging member comprises a rigid arm 152 that is fixedly secured at one end to the rear wall 64 of camera housing section 16. The free or forward end 154 of arm 152 is in alignment with the access slot 60 in the trailing end of film container 12 and also in alignment with the trailing edge of the forwardmost film unit 14. In a preferred embodiment, the forward end 154 is contoured or notched to firmly engage only the forwardmost film unit 14 and not the next underlying film unit 14.

In operation, the static edge pushing member 152 performs the same function as the friction type, namely, to provide a stop for the forwardmost film unit while the film container 12 and the rest of its contents are moved rearwardly by the carrier base plate 82.

One major advantage of the edge pusher type of film engaging member is that advancement of the forwardmost film unit 14 is accomplished in response to simple linear rearward movement of the carrier base plate 82. There is no requirement to also provide upward motion of the trailing end of the film container 12 during its movement from the exposure position of FIG. 8 to the terminal position of FIG. 9.

In this embodiment, the lower housing section 16 of camera 10 is provided with a pair of spaced linear tracks or channels 156 running along the length of the side walls 66 for guiding the carrier base plate 82 between the exposure position of FIG. 8 and terminal position of FIG. 9.

The tracks or channels 156 are configured to receiving leading and trailing end pairs of roller bearings 118 and 120 mounted on the lateral edge of carrier base plate 82. In the interest of economy, the roller bearings 118 and 120 may be eliminated and tracks 156 may be configured to receive the lateral edges of carrier base plate 82.

It will be understood that the forward end of housing section 16 and upper portion of camera 10, although not shown in FIGS. 8 and 9, include the same exposure control mechanism, optical system, processing station, motor drive, carrier slide mechanism, and return spring as described earlier.

From the foregoing, one skilled in the art will appreciate that the static edge pusher type of film engaging member 152 offer substantial cost savings over the frictional type. Not only is the motion of carrier plate 82 reduced to simple linear reciprocating movement, but the film engaging portion 154 of member 152 is not subject to the wear of the frictional type of film engaging member.

The choice of whether to use the frictional or edge pusher type may not be simply a matter of economics. Other considerations such as the space available in the trailing end of the camera housing section 16 after mounting other mechanism (such as a film counter, etc.) may be the determining factor.

In all of the previously described embodiments, the processing station 80 has been mounted on the carrier base plate 82 for movement therewith between the exposure and terminal position. It is within the scope of the present invention to alternatively fixedly mount the processing station 80 on the bottom wall 62 of camera housing section 16 as diagrammatically illustrated in FIGS. 10, 11 and 12.

Figure 10:
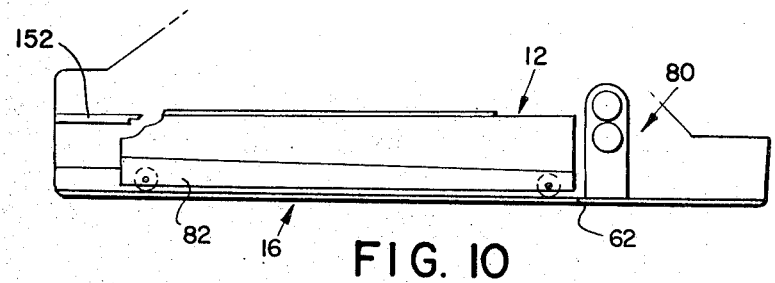
FIGS. 10, 11 and 12 are diagrammatic illustrations of yet another alternate embodiment of the present invention wherein the processing station is not mounted on the carrier.
Figure 11:
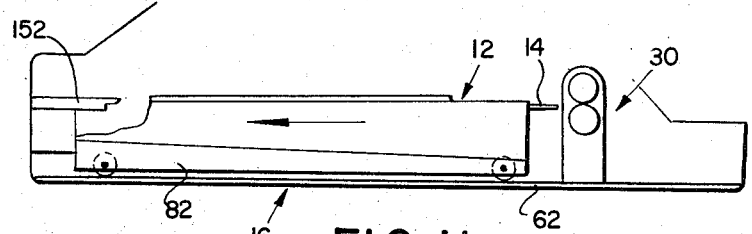
Figure 12:
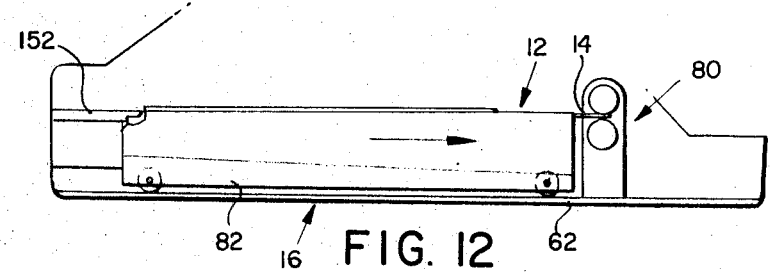

In this alternative embodiment, the carrier base plate 82 is initially positioned in the exposure position of FIG. 10 and then is moved rearwardly (to the left) to the terminal position of FIG. 11 to cause static edge engaging member 152 (or friction type 116) to advance the forwardmost film unit 14 through the film withdrawal slot 58. With the leading end of film unit 14 protruding through slot 58, the carrier base plate 82 is moved forwardly (to the right) past the exposure position to an insertion position shown in FIG. 12 wherein the leading edge of film unit 14 is bed into the bite of the rollers forming part of processing station 80. Alternatively, the insertion position of FIG. 12 could coincide with the exposure position of FIG. 10.

The position of the normally open switch for energizing motor 104 would have to be changed so that it is engaged and closed as carrier base plate 82 approaches the insertion position. Also a friction pad may have to be placed on the interior surface of the forward wall 42 of the film container to insure that the protruding leading end of the film unit 14 is not pushed back into the film container 12 as the leading edge of the film unit 14 comes into contact with the pressure applying rollers.

In summary, a photographic apparatus, embodied as a self-developing camera, has been provided which includes a film transport system that features a fixed mounted or static film engaging member for advancing a film unit from a film container to a camera mounted processing station.

The prior art is replete with examples of film transport systems which feature kinetic film engaging members which move relative to a film container fixedly supported in the camera. Considering the precision and reliability requirements of the kinetic picks with their close tolerance movable parts, the present invention provides a simpler and less expensive alternative which is capable of restoring the cost of the film transport system to an acceptable percentage of the total cost of relatively simple self-developing cameras.

Since certain changes may be made in the above system and apparatus without departing from the scope of the invention herein involved, it is intended that all matter contained in the above description or shown in the accompanying drawings shall be interpreted as illustrative and not in a limiting sense.

What is claimed is:

1. Photographic apparatus for use with a film container holding at least one film unit, the film unit being of the type comprising leading and trailing edges, a plurality of layers including photosensitive and image-receiving layers, and an integral supply of fluid processing composition adapted to be distributed between a predetermined pair of the layers, the film container being of the type including a film withdrawal slot therein through which the film unit is adapted to be advanced, leading edge first, to withdraw the film unit from the film container and an opening providing access for externally mounted means to engage and advance the film unit, leading edge first, through the film withdrawal slot, said photographic apparatus comprising:

a housing;

carrier means for receiving and supporting such a film container holding at least one film unit;

means mounting said carrier means within said housing for movement between first and second positions;

static film advance means fixedly mounted in said housing and positioned to extend through the opening in the film container supported by said carrier means, when said carrier means is moved from said first position toward said second position, for engaging and advancing the film unit, leading edge first, through the film withdrawal slot in the film container in response to movement of said carrier means towards said second position;

processing means mounted on said carrier means for movement therewith and being located in a predetermined relationship with the film withdrawal slot in the film container supported by said carrier means for receiving the film unit advanced through the film withdrawal slot during movement of said carrier means towards said second position and for applying a compressive pressure progressively along the length of the film unit from the leading edge towards the trailing edge to distribute the fluid processing composition between the predetermined pair of layers in the film unit; and means operable to move said carrier means between said first and second positions within said housing.

2. Photographic apparatus as defined in claim 1 wherein said means mounting said carrier means for movement defines a path of travel for said carrier means within said housing such that movement of said carrier means from said first position towards said second position is in a direction that is substantially opposite the direction of advancement of the film unit through the film withdrawal slot in the film container and movement of said carrier means from said second position towards said first position is in a direction that is substantially the same as the direction of film advancement through the film withdrawal slot in the film container.

3. Photographic apparatus as defined in claim 2 wherein said static film advance means includes means positioned to engage the trailing edge of the film unit for stopping the film unit as the film container moves with said carrier means from said first position towards said second position thereby establishing relative motion between the film unit and film container to cause the film unit to advance, leading edge first, through the film withdrawal slot in the film container.

4. Photographic apparatus as defined in claim 3 wherein said means mounting said carrier means for movement defines a linear path of travel for said carrier means between said first and second positions within said housing.

5. Photographic apparatus as defined in claim 2 wherein said static film advance means includes means positioned to frictionally engage a surface of the film unit, intermediate the leading and trailing edges thereof, for stopping the film unit as the film container moves from said first position towards said second position with said carrier means thereby establishing relative motion between the film unit and the film container to cause the film unit to advance, leading edge first, through the film withdrawal slot in the film container.

6. Photographic apparatus as defined in claim 5 wherein said frictional engaging means is transversely spaced from the surface of the film unit when said carrier means is located in said first position and said means mounting said carrier means for movement defines a non-linear path of travel for said carrier means from said first to said second positions so that the film container supported by said carrier means and the film unit move transversely towards said frictional engaging means as said carrier means moves toward said second position to establish frictional contact between said frictional engaging means and the surface of the film unit thereby stopping the film unit and establishing relative movement between the film unit and the film container as the carrier is moved further towards said second position to cause the film unit to be advanced, leading edge first, through the film withdrawal slot in the film container.

7. Photographic apparatus as defined in claim 1 wherein said means for moving said carrier means includes manually operable means coupled to said carrier means for manually moving said carrier means from said first position to said second position.

8. Photographic apparatus as defined in claim 7 wherein said means for moving said carrier means further includes biasing means for urging said carrier from said second position towards said first position.

9. Photographic apparatus as defined in claim 1 further including exposure means for exposing the film unit held in the film container supported by said carrier means located in said first position prior to movement of said carrier means from said first position towards said second position to cause the film unit to be advanced through the film withdrawal slot.

10. Photographic apparatus as defined in claim 1 wherein said processing means includes a pair of pressure applying rollers between which the film unit is adapted to be progressively advanced, leading edge first, such that said pair of rollers apply a compressive pressure along the length of the film unit to distribute the fluid processing composition between the predetermined pair of layers in the film unit.

11. Photographic apparatus as defined in claim 10 further including drive means for driving at least one of said pair of rollers in a direction to cause the film unit received from the film container to be advanced between said pair of rollers.

12. Photographic apparatus as defined in claim 11 wherein said drive means includes a motor and means operatively coupling said motor to said one roller.

13. Photographic apparatus as defined in claim 12 further including means responsive to movement of said carrier means from said first position towards said second position for energizing said motor thereby causing said motor to drive said one roller.

14. Photographic apparatus as defined in claim 13 wherein said means for moving said carrier means includes manually operable means coupled to said carrier means for manually moving said carrier means from said first position towards said second position.

15. Photographic apparatus as defined in claim 13 wherein said motor is electrically operated and said means for energizing said motor includes a normally open electrical switch for connecting said electrically operated motor to a source of electrical energy when said normally open switch is closed, said switch being mounted in said housing and positioned in the path of travel of said carrier means and film container from said first position to said second position so as to be engaged and closed by said carrier means or the film container supported thereon as said carrier means is moved from said first position towards said second position.

16. Photographic apparatus for use with a film container holding at least one film unit, the film unit being of the type comprising leading and trailing edges, a plurality of layers including photosensitive and image-receiving layers, and an integral supply of fluid processing composition that is adapted to be distributed between a predetermined pair of the layers, the film container being of the type including an exposure aperture through which the film unit may be exposed, a film withdrawal slot at one end of the film container through which the film unit is adapted to be advanced, leading edge first, to withdraw the film unit from the film container, and an access opening at the opposite end of the film container providing access for externally mounted means to engage and advance the film unit, leading edge first, through the film withdrawal slot, said photographic apparatus comprising:

a housing;
carrier means for receiving and supporting such a film container holding at least one such film unit;
means mounting said carrier means for movement along a linear path of travel within said housing between an exposure position and a terminal position;
means operable to move said carrier means between said exposure and terminal positions;
exposure means for exposing the film unit through the exposure aperture of the film container supported by said carrier means located at said exposure position;
static film advance means fixedly mounted in said housing and including a film engaging portion thereof positioned to extend through the access opening in the film container, when said carrier means is moved from said exposure position towards said terminal position, for engaging the trailing edge of the film unit and stopping the film unit to establish relative motion between the stopped film unit and the film container being moved towards said terminal position by said carrier means thereby causing the film unit to be advanced, leading edge first, through the film withdrawal slot in response to movement of said carrier means from said exposure position towards said terminal position;

processing means, including a pair of pressure applying rollers, mounted on said carrier means for movement therewith, said pair of rollers being located in predetermined relation with the film withdrawal slot of the film container supported on said carrier means for receiving the film unit from the film container and applying a compressive pressure progressively along the length thereof, from the leading edge towards the trailing edge, to distribute the fluid processing composition; and drive means for driving at least one of said rollers in a direction to cause the film unit to be progressively advanced between said rollers for the application of compressive pressure thereto.

17. Photographic apparatus as defined in claim 16 wherein said carrier means is mounted for movement from said exposure position to said terminal position in a direction that is substantially opposite the direction of film advancement through the withdrawal slot in the film container.

18. Photographic apparatus as defined in claim 16 wherein said means mounting said carrier means includes a pair of spaced linear tracks mounted in said housing and means coupling said carrier means to said pair of tracks.

19. Photographic apparatus as defined in claim 16 further including actuating means responsive to movement of said carrier means from said exposure position to said terminal position for actuating said drive means.

20. Photographic apparatus for use with a film container holding at least one film unit, the film unit being of the type comprising leading and trailing edges, a plurality of layers including photosensitive and image-receiving layers, and an integral supply of fluid processing composition that is adapted to be distributed between a predetermined pair of the layers, the film container being of the type including an exposure aperture through which the film unit may be exposed, a film withdrawal slot at one end of the film container through which the film unit is adapted to be advanced, leading edge first, to withdraw the film unit from the film container, and an access opening at the opposite end of the film container providing access for externally mounted means to engage and advance the film unit, leading edge first, through the film withdrawal slot, said photographic apparatus comprising:

a housing;

carrier means for receiving and supporting such a film container holding at least one such film unit;

means mounting said carrier means for movement along a non-linear path of travel within said housing between an exposure position and a terminal position;

means operable to move said carrier means between said exposure and terminal positions;

exposure means for exposing the film unit through the exposure aperture of the film container supported by said carrier means located at said exposure position;

static film advance means fixedly mounted in said housing and including a film engaging portion thereof positioned to extend through the exposure aperture in the film container, when said carrier means is moved from said exposure position towards said terminal position, for frictionally engaging a surface of the film unit, intermediate the leading and trailing edges thereof, and stopping the film unit to establish relative motion between the stopped film unit and the film container being moved towards said terminal position by said carrier means thereby causing the film unit to be advanced, leading edge first, through the film withdrawal slot in response to movement of said carrier means from said exposure position towards said terminal position;

processing means, including a pair of pressure applying rollers, mounted on said carrier means for movement therewith, said pair of rollers being located in predetermined relation with the film withdrawal slot of the film container supported on said carrier means for receiving the film unit from the film container and applying a compressive pressure progressively along the length thereof, from the leading edge towards the trailing edge, to distribute the fluid processing composition; and drive means for driving at least one of said rollers in a direction to cause the film unit to be progressively advanced between said rollers for the application of compressive pressure thereto.

21. Photographic apparatus as defined in claim 20 wherein said film engaging portion of said static film advance means is transversely spaced from the exposure aperture of the film container and the surface of the film unit therein, when said carrier means is located in said exposure position, and said means mounting said carrier means for movement defines a non-linear path of travel for said carrier means from said exposure position to said terminal position so that the film container supported by said carrier means moves transversely towards said film engaging portion as said carrier moves towards said terminal position to establish frictional contact between said film engaging portion and the surface of the film unit thereby stopping the film unit and establishing relative motion between the film unit and the film container to cause the film unit to be advanced through the film withdrawal slot.

22. Photographic apparatus for use with a film container holding at least one film unit, the film unit being of the type comprising leading and trailing edges, a plurality of layers including photosensitive and image-receiving layers, and an integral supply of fluid processing composition that is adapted to be distributed between a predetermined pair of layers, the film container being of the type including an exposure aperture through which the film unit may be exposed, a film withdrawal slot at one end of the film container through which the film unit is adapted to be advanced, leading edge first, to withdraw the film unit from the film container, and an access opening at the opposite end of the film container providing access for externally mounted means to engage and advance the film unit, leading edge first, through the film withdrawal slot, said photographic apparatus comprising:

a housing;

carrier means for receiving and supporting such a film container holding at least one such film unit;

means mounting said carrier means for movement along a non-linear path of travel within said housing between an exposure position and a terminal position;

means operable to move said carrier means between said exposure and terminal positions;

exposure means for exposing the film unit through the exposure aperture of the film container supported by said carrier means located at said exposure position;

static film advance means fixedly mounted in said housing and including a film engaging portion thereof positioned to extend through the access opening in the film container, when said carrier means is moved from said exposure position towards said terminal position, for frictionally engaging a surface of the film unit intermediate the leading and trailing edges thereof and stopping the film unit to establish relative motion between the stopped film unit and the film container being moved towards said terminal position by said carrier means thereby causing the film unit to be advanced, leading edge first, through the film withdrawal slot in response to movement of said carrier means from said exposure position towards said terminal position;

processing means, including a pair of pressure applying rollers, mounted on said carrier means for movement therewith, said pair of rollers being located in predetermined relation with the film withdrawal slot of the film container supported on said carrier means for receiving the film unit from the film container and applying a compressive pressure progressively along the length thereof, from the leading edge towards the trailing edge, to distribute the fluid processing composition; and drive means for driving at least one of said rollers in a direction to cause the film unit to be progressively advanced between said rollers for the application of compressive pressure thereto.

23. Photographic apparatus for use with a film container holding at least one film unit, the film unit being of the type comprising leading and trailing edges, a plurality of layers including photosensitive and image-receiving layers, and an integral supply of fluid processing composition adapted to be distributed between a predetermined pair of the layers, the film container being of the type including a film withdrawal slot therein through which the film unit is adapted to be advanced, leading edge first, to withdraw the film unit from the film container and an opening providing access for externally mounted means to engage and advance the film unit, leading edge first, through the film withdrawal slot, said photographic apparatus comprising:

a housing;

carrier means for receiving and supporting such a film container holding at least one film unit;

means mounting said carrier means within said housing for movement between first and second positions;

static film advance means fixedly mounted in said housing and position to extend through the opening in the film container supported by said carrier means, when said carrier means is moved from said first position toward said second position, for engaging and advancing at least a portion of the film unit, leading edge first, through the film withdrawal slot in the film container in response to movement of said carrier means towards said second position;

processing means mounted in said housing and being located in a predetermined relationship with the film withdrawal slot in the film container supported by said carrier means located in said first position for receiving the film unit advanced through the film withdrawal slot in response to moving said carrier means from said second position back towards said first position and for applying a compressive pressure progressively along the length of the film unit from the leading edge towards the trailing edge to distribute the fluid processing composition between the predetermined pair of layers in the film unit; and means operable to move said carrier means between said first and second positions within said housing.

24. A method of advancing a film unit from a film container in a photographic apparatus and processing the film unit, the film unit being of the type comprising leading and trailing edges, a plurality of layers including photosensitive and image-receiving layers, and an integral supply of fluid processing composition adapted to be distributed between a predetermined pair of the layers, the film container including a film withdrawal slot and an opening providing access to the film unit, and the photographic apparatus including exposure means, static film advance means, and processing means, said method comprising the steps of:

locating the film container in said apparatus so that the film unit therein is in position for exposure;

exposing the film unit with said exposure means;

moving said film container towards said static film advance means to cause said static film advance means to extend through the opening in the film container and engage said film unit;

stopping the film unit with said static film advance means while continuing to move said film container towards said static film advance means to establish relative motion between said film unit and said film container to cause said film unit to be advanced, leading edge first, through said film withdrawal slot;

engaging the film unit with said processing means; and applying a compressive pressure along the length of said film unit with said processing means to cause said fluid processing composition to be distributed between the predetermined layers of the film unit.

* * * * *